United States Patent Office 3,697,221
Patented Oct. 10, 1972

3,697,221
USE OF THIONIUM DERIVATIVES AS CORROSION INHIBITORS
Derek Redmore, Ballwin, and Bernardus A. Oude Alink, St. Louis, Mo., assignors to Petrolite Corporation, Wilmington, Del.
No Drawing. Filed Jan. 19, 1970, Ser. No. 4,046
Int. Cl. C23f 11/04, 11/16
U.S. Cl. 21—2.5    6 Claims

ABSTRACT OF THE DISCLOSURE 1,2-dithiole-3-thiones, particularly the quaternaries thereof (i.e., thionium derivatives), are particularly useful as corrosion inhibitors in aqueous and/or aerated and/or highly acidic systems. The yields of thionium derivatives are increased by reacting 1,2-dithiole-3-thiones with quaternizing agents by reducing the amounts of, and preferably in the substantial absence of, solvents.

---

1,2 dithiole-3-thiones are known compounds prepared by a variety of methods. Examples of such compounds, and methods for their preparation, are disclosed in The Chemistry of Heterocyclic Compounds, "Multi-Sulfur and Sulfur and Oxygen Five- and Six-Membered Heterocycles, "Part 1, pages 237–386, by David S. Breslow et al. Interscience Publishers, 1966.

1,2-dithiole-3-thiones may be expressed by the formula:

$$\begin{array}{c} S \\ R-C \diagup \diagdown S \\ \| \phantom{xx} | \\ R'-C\text{———}C=S \end{array}$$

where R and R' are substituted groups, for example, alkyl, aryl, cycloalkyl, alkenyl, alkynyl, alkaryl, aralkyl, heterocyclic, etc. In addition, one of the above R's may be hydrogen. Examples of a wide variety of 1,2-dithiole-3-thiones are presented in the above text by Breslow et al. in Table 4, pages 352–366, which is incorporated into this application as if part thereof.

Quaternaries of these compounds have been prepared from these compounds according to the following reaction:

$$\begin{array}{c} S \\ R-C \diagup \diagdown S \\ \| \phantom{xx} | \\ R'-C\text{———}C=S \end{array} + R''X \longrightarrow \left[\begin{array}{c} S \\ R-C \diagup \diagdown S \\ \| \phantom{xx} | \\ R'-C\text{———}C-SR'' \end{array}\right]^{\oplus} X^{\ominus}$$

where R"X is a quaternizing compound.

Examples of quaternaries or thionium derivatives of 1,2-dithiole-3-thiones are presented in Table 7 of Breslow et al., pages 394–6, which is incorporated by reference into this application as if part hereof.

We have now discovered the yield of the quaternaries (or thionium derivatives of 1,2-dithiole-3-thiones) can be enhanced, by reducing the solvent or preferably in the substantial absence of solvents substantially quantitative yields can be obtained as compared to low yields obtained when prepared in the presence of solvents.

1,2-dithiole-3-thiones are conveniently prepared by the classic method of reacting an olefin with sulfur, for example, according to the following equation:

$$\text{RCH}=\underset{\underset{R'}{|}}{\text{C}}-\text{CH}_3 + 5S \longrightarrow \begin{array}{c} S \\ R-C \diagup \diagdown S \\ \| \phantom{xx} | \\ R'-C\text{———}C=S \end{array} + 2H_2S$$

The olefin employed in the reaction contains
(1) a reactive double bond
(2) a primary carbon atom
(3) at least four hydrogen atoms on the 3 terminal carbons with at least one hydrogen on the carbon beta to primary carbon atom.

This reaction is carried out at any suitable temperature and time, for example, at about 100 to 300° C., such as from about 140 to 240° C. but preferably from about 160 to 220° C. for a period of about 2 to 160 hours, and about 10 to 50 hours, but preferably about 15 to 40 hours.

The thionium compounds are prepared by reacting the 1,2-dithiole-3-thiones with any suitable quaternizing agent at suitable temperatures and times, such as a temperature of from about 40 to 200° C., but preferably from about 50 to 180° C., for a period of about 1 to 24 hours, such as about 2 to 15 hours, but preferably 3 to 6 hours.

The following examples are presented by way of illustration and not of limitation.

EXAMPLE 1

The preparation of 4-phenyl-,2-dithiole-3-thione

In a suitable reactor equipped with a stirrer, thermometer and a reflux condenser, was placed 118 g. of methylstyrene and 48 g. of sulfur. The mixture was heated for 37 hours at 200–210° C. After the reaction was completed, the mixture was slowly cooled to room temperature. The product was collected and crystallized from benzene, red crystals (32 grams, 50% yield), M.P. 122–124° C.

Method A.—Quaternization of 4-phenyl-1,2-dithiole-3-thione in the presence of solvent-isopropanol with $(CH_3)_2SO_4$ A sample of 21.0 g. of 4-phenyl-1,2-dithiole-3-thione (Ex. 1) and 12.6 g. of dimethylsulfate $(CH_3)_2SO_4$ in 180 cc. of isopropanol was refluxed for 24 hours. After this period 4.5 g. of the product was removed by decanting the hot isopropanol solution. After the isopropanol cooled to room temperature, crystallization took place. The crystals, 3 g. were identified as unreacted starting material. Yield was 64%.

Method B.—Quaternization of 4-phenyl-1,2-dithiole-3-thione in the presence of solvent-benzene with $(CH_3)_2SO_4$ A sample of 8.4 g. of 4-phenyl-1,2 dithiole-3-thione (Ex. 1) and 5.0 g. of dimethylsulfate in 100 cc. of benzene was refluxed for 24 hours. The product was dissolved in a mixture of 100 cc. $H_2O$ and 10 cc. of acetone. About 1.0 g. of by-product was formed. Yield was 85%.

EXAMPLE 2

Preparation of 4-(3-methoxy-4-hydroxy)phenyl-1,2-dithiole-3-thione

In a suitable reactor equipped with a stirrer, thermometer, addition funnel and reflux condenser was placed, 32 g. of sulfur, 1.0 g. of di-o-tolylguanidine as catalyst and 150 cc. of mesitylene as solvent. The mixture was brought to a reflux (170° C.) and over a 1 hour period 66 g. of isoeugenol was added dropwise. Reflux was continued for 48 more hours. The mesitylene was decanted from the solid. The solid was treated twice with 500 cc. portion of a 5% aqueous potassium hydroxide solution. Upon acidification the product precipitated as a brown solid.

A 5.2 g. sample of 5-(3-methoxy-4-hydroxy)phenyl-1,2-dithiole-3-thione was quaternized following Method B, (with benzene as a solvent) the yield was 40%.

Method C.—Quaternization without solvent with $(CH_3)_2SO_4$

A 17.0 g. sample of 5-(3-methoxy-4-hydroxy)phenyl-1,2-dithiole-3-thione and 8.5 g. of dimethyl sulfate were heated for 1 hour at 100–120° C. After the reaction was completed 25.5 g. of isopropanol was added to give a homogeneous solution. Yield was quantitative.

EXAMPLE 3

Preparation of 4-neopentyl-5-t-butyl-1,2-dithiole-3-thione

To a mixture of 320 g. of sulfur and 6.0 g. of di-o-tolylguanidine was added over a 9 hour period, at a reaction temperature of 210–215° C., 336 g. of triisobutylene,

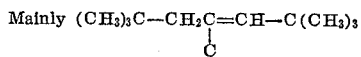

Heating at 210–215° C. was continued for an additional 14 hours. The product was distilled and there was collected 220 g. 4-neopentyl-5-t-butyl-1,2-dithiole-3-thione, B.P. 155–185° C. (3–4 mm. Hg).

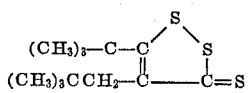

Quaternization acording to Method A (with isopropanol as solvent) failed. The use of acetic acid as the solvent in the quaternization was unsuccessful. Method C (without solvent), however, converted 4-neopentyl-5-t-butyl-1,2-dithiole-3-thione quantitatively to its quaternary methosulfate.

Method D.—Quaternization of 4-neopentyl-5-t-butyl-1,2-dithiole-3-thione with methyl iodide employing chloroform as solvent A sample of 3.0 g. of 4-neopentyl-5-t-butyl-1,2 dithiole-3-thione and 6.0 g. of methyl iodide in 50 cc. of chloroform was allowed to stand overnight. The solvent was removed and the orange solid washed with isopropanol and benzene, M.P. 135–142° C. Yield was 3.8 g. (82%).

EXAMPLE 4

Preparation 4,5-tetramethylene-1,3-dithiole-3-thione

In a suitable reactor equipped with a stirrer, reflux condenser, thermometer and addition funnel was placed 24 g. of sulfur, 171 g. of carbon disulfide and 150 cc. of dimethyl formamide. The mixture was cooled to 0° C. and under continuous stirring and cooling 132 g. of 1-morpholino-1-cyclohexene was introduced over a ½ hour period. After the addition was completed, stirring was continued for an additional 16 hrs. The resulting slurry was poured into water and the resulting orange solid crystallized from acetone, M.P. 95–97° C. Yield 37%.

Method A.—Quaternization of 4,5-tetramethylene-1,2-dithiole-3-thione in the presence of solvent-isopropanol A sample of 11.3 g. of 4,5-tetramethylene-1,3-dithiole-3-thione and 7.6 g. of dimethyl sulfate in 100 cc. of isopropanol was refluxed for 24 hrs. During this time hydrogen sulfide is evolved. After the reaction was completed 5 g. of a hard blue solid crystallized from the solution.

The nuclear magnetic resonance spectrum of the product is consistent with the following structure:

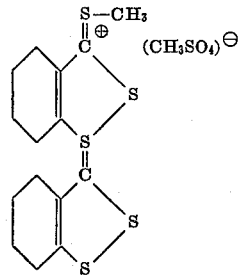

The mother liquor contained 50% of 3-S-methyl-4,5-tetramethylene-1,2-dithiole-3-thione methosulfate.

The following table presents illustrative 1,2-dithiole-3-thiones of the formula

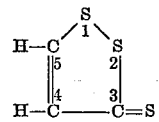

The radical indicated replaces the H's in the 4th and/or 5th positions as indicated.

TABLE I

| | |
|---|---|
| (1) | 4-$CH_3$ |
| (2) | 5-$CH_3$- |
| (3) | 4-$C_2H_5$- |
| (4) | 5-$C_2H_5$- |
| (5) | 4-$(CH_3)_3CCH_2$- |
| (6) | 5-n-$C_{17}H_{35}$- |
| (7) | 4-$C_6H_5$- |
| (8) | 5-$C_6H_5$- |
| (9) | 4-(p-$CH_3C_6H_4$-) |
| (10) | 5-(p-$CH_3C_6H_4$-) |
| (11) | 4-p-$C_2H_5C_6H_4$-) |
| (12) | 4-(p-t-$C_4H_9C_6H_4$-) |
| (13) | 4-(p-t-$C_5H_{11}C_6H_4$-) |
| (14) | 5-(p-$C_6H_5$-$C_6H_4$-) |
| (15) | 5-(p-$ClC_6H_4$-) |
| (16) | 5-(p-$BrC_6H_4$-) |
| (17) | 5-(p-$IC_6H_4$-) |
| (18) | 4-(p-$CH_3OC_6H_4$-) |
| (19) | 5-(o-$CH_3OC_6H_4$-) |
| (20) | 5-(p-$CH_3OC_6H_4$-) |
| (21) | 5-(p-$HOC_6H_4$-) |
| (22) | 5-(p-$CH_3CO_2C_6H_4$-) |
| (23) | 5-[p-$(CH_3)_2NC_6H_4$-] |
| (24) | 5-[2,4-$(CH_3)_2C_6H_3$-] |
| (25) | 5-(2-$CH_3O$-5-$CH_3C_6H_3$-) |
| (26) | 5-[2,3-$(CH_3O)_2C_6H_3$-] |
| (27) | 5-[2,5-$(CH_3O)_2C_6H_3$-] |
| (28) | 5-[3(4-$(CH_3O)_2C_6H_3$-] |
| (29) | 5-(3-$CH_3O$5-4-$HOC_6H_3$) |
| (30) | 5-(2-HO-3-$CH_3OC_6H_3$-) |
| (31) | 5-(3-$CH_3O$-4-$CH_3O_2CCH_2OC_6H_3$-) |
| (32) | 5-[3,4-$(HO)_2C_6H_3$-] |
| (33) | 5-[3,4-$(CH_3CO_2)_2C_6H_3$-] |
| (34) | 5-(3,4-methylenedioxyphenyl-) |
| (35) | 5-(3,4,5-$I_3C_6H_2$-) |
| (36) | 4-(1-naphthyl-) |
| (37) | 4-(1-naphthyl-) |
| (38) | 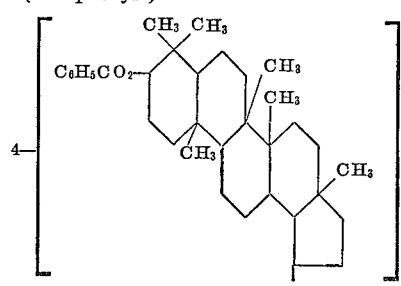 |

(39) 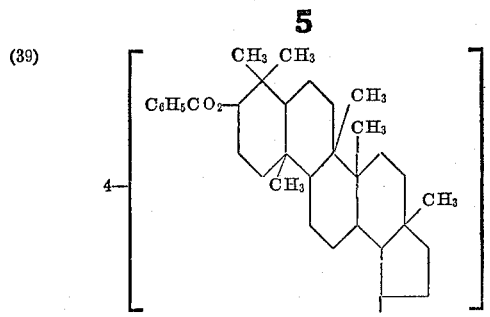

(40) 5-(2-furyl-)
(41) 4-(2-thienyl-)
(42) 5-(2-thienyl-)
(43) 4-(4-$CH_3$-2-thienyl-)
(44) 5-(5-$CH_3$-2-thienyl-)
(45) 5-(5-$C_2H_5$-2-thienyl-)
(46) 4-[3,4-$(CH_3)_2$-2-thienyl-]
(47) 5-(2-pyridyl-)
(48) 5-(3-pyridyl-)
(49) 5-(4-pyridyl-)
(50) 5-($C_6H_5$CH=CH-)
(51) 5-(p-$CH_3OC_6H_4$CH=CH-)
(52) 5-(2-furyl-CH=CH-)
(53) 5-[p-$(CH_3)_2NC_6H_4$N=CH-]
(54) 5-[p-$(CH_3)_2NC_2H_4$N=CH-]
(55) 5-$C_2H_5$OOC-
(56) 5-HOOC-
(57) 4,5-$(CH_3$-$)_2$
(58) 4-$CH_3$-5-$C_2H_5$-
(59) 4-$C_2H_5$-5-$CH_3$-
(60) 4,5-$(C_2H_5$-$)_2$
(61) 4-(n-$C_3H_7$-)-5-$CH_3$-
(62) 4-(n-$C_4H_9$-)-5-$CH_3$-
(63) 4-$CH_3$-5-(t-$C_4H_9$-)
(64) 4-$(CH_3)_3CCH_2$-5-(t-$C_4H_9$-)
(65) 4-[$(C_2H_5)_2NCH_2CH_2$-]-5-$CH_3$·$HClO_4$
(66) 4-[$(C_2H_5)_2NCH_2CH_2$-]-5-$CH_3$·HCl
(67) 4-$C_6H_5CH_2$-5-$CH_3$-
(68) 4-$CH_3$-5-$C_6H_5$-
(69) 4-$C_6H_5$-5-$CH_3$-
(70) 4-$C_2H_5$-5-$C_6H_5$-
(71) 4-$CH_3$-5-(p-$CH_3C_6H_4$-)
(72) 4-$CH_3$-5-(p-$ClC_6H_4$-)
(73) 4-$CH_3$-5-(p-$BrC_6H_4$-)
(74) 4-$CH_3$-5-(p-$IC_6H_4$-)
(75) 4-$CH_3$-5-(o-$CH_3OC_6H_4$-)
(76) 4-$CH_3$-5-(p-$CH_3OC_6H_4$-)
(77) 4-(p-$CH_3OC_6H_4$-)-5-$CH_3$-
(78) 4-$CH_3$-5-[2,4-$(CH_3)_2C_6H_3$-]
(79) 4-$CH_3$-5-[2,5-$(CH_3)_2C_6H_3$-]
(80) 4-$CH_3$-5-[3,4-$(CH_3)_2C_6H_3$-]
(81) 4-$CH_3$-5-(4-$CH_3$O-3-$CH_3C_6H_3$-)
(82) 4-$CH_3$-5-(2$CH_3$O-4-$CH_3C_6H_3$-)
(83) 4-$CH_3$-5-(2-$CH_3$O-5-$CH_3C_6H_3$-)
(84) 4-$CH_3$-5-(2-$CH_3$S-5-$CH_3C_6H_3$-)
(85) 4-$CH_3$-5-(2-HO-3-$CH_3OC_6H_3$-)
(86) 4-$CH_3$-5-[2,4-$(CH_3O)_2C_6H_3$-]
(87) 4-$CH_3$-5-[2,5-$(CH_3O)_2C_6H_3$-]
(88) 4-$CH_3$-5-[3,4-$(CH_3O)_2C_6H_3$-]
(89) 4-$CH_3$-5-[2,4 6-$(CH_3)_3C_6H_2$-]
(90) 4-(1-naphthyl-)-5-$CH_3$-
(91) 4-(1-naphthyl-)-5-$C_2H_5$-
(92) 4-$CH_3$-5-(2-$CH_3$O-1-naphthyl-)
(93) 4-$CH_3$-5-(2-thienyl-)
(94) 4-(2-thienyl-)-5-$CH_3$-
(95) 4-(5-$CH_3$-2-thienyl-)-5-$CH_3$-
(96) 4-$CH_3$-5-(5-$CH_3$-2-thienyl-)
(97) 4-$C_2H_5$-5-(5-$CH_3$-2-thienyl-)
(98) 4-(5-$C_2H_5$-2-thienyl-)-5-$CH_3$-
(99) 4-$CH_3$-5-(5-$C_2H_5$-2-thienyl-)
(100) 4-$C_2H_5$-5-(5-$C_2H_5$-2-thienyl-)
(101) 4-$CH_3$-[4,5-$(CH_3)_2$-2-thienyl-]
(102) 4-$CH_3$-5-(3-pyridyl-)
(103) 4-$C_2H_5$-5-(3-pyridyl-)
(104) 4-n-$C_4H_9$-5-(3-pyridyl-)
(105) 4-$CH_3$-3-(4-pyridyl-)
(106) 4-$C_2H_5$-5-(4-pyridyl-)
(107) 4-$C_2H_5$-5-($C_6H_5$CH=CH-)
(108) 4-$CH_3$-5-(p-$CH_3OC_6H_4$CH=CH-)
(109) 4-$C_2H_5$-5-(p-$CH_3OC_6H_4$CH=CH-)
(110) 4-(-n-$C_3H_7$-)-5-(p-$CH_3OC_6H_4$CH=CH-)
(111) 4-$C_2H_5$-5-(2-furyl-CH=CH-)
(112) 4-(n-$C_3H_7$-)-5-(2-furyl-CH=CH-)
(113) 4-$C_6H_5$-5-$C_6H_5CH_2$-
(114) 4-($C_6H_5$CO-)-5-$C_6H_5$-
(115) 4-($C_6H_5$CS-)-5-$C_6H_5$-
(116) 4,5-$(C_6H_5$-$)_2$
(117) 4-(p-$CH_3OC_6H_4$-)-5-$C_6H_5$-
(118) 4-(p-$HOC_6H_4$-)-5-$C_6H_5$-
(119) 4-(p-$CH_3CO_2C_6H_4$-)-5-$C_6H_5$-
(120) 4-$C_6H_5$-5-(2-$CH_3$O-5-$CH_3C_6H_3$-)
(121) 4,5-(p-$CH_3OC_6H_4$-$)_2$
(122) 4-[2,4-$(CH_3O)_2C_6H_3$-]-5-$C_6H_5$-
(123) 4-(3-$HO_3$S-4-$CH_3OC_6H_3$-)-5-$C_6H_5$-
(124) 4-(3-$ClO_2$S-4-$CH_3OC_6H_3$-)-5-$C_6H_5$-
(125) 4-(3-$C_2H_5O_3$S-4-$CH_3OC_6H_3$-)-5-$C_6H_5$-
(126) 4-(3-$C_6H_5NHO_2$S-4-$CH_3OC_6H_3$-)-5-$C_6H_5$-
(127) 4-(3-$CH_3$CO-4-$CH_3OC_6H_3$-)-5-$C_6H_5$-
(128) 4-(3-$C_2H_5$CO-4-$CH_3OC_6H_3$-)-5-$C_6H_5$-
(129) 4-$C_6H_5$-5-(3-pyridyl-)
(130) 4-$C_6H_5$-5-(4-pyridyl-)
(131) 4-$C_6H_5$-5-(2-furyl-CH=CH-)
(132) 4-$CH_3$-5-$CH_3O_2$C-
(133) 4-$CH_3O_2$C-5-$C_6H_5$-
(134) 4-$C_2H_5O_2$C-5-$C_6H_5$-
(135) 4-$C_6H_5$-5-$CH_3O_2$C-
(136) 4-$CH_3$-5-[p-$(CH_3)_2NC_6H_4$N=CH-]
(137) 4-$C_2H_5$-5-[p-$(CH_3)_2NC_6H_4$N=CH-]
(138) 4-(n-$C_3H_7$-)-5-[p-$(CH_3)_2NC_6H_4$N=CH-]
(139) 4-$C_6H_5$-5-[p-$(CH_3)_2NC_6H_4$N=CH-]

(140) 4—$CH_3$—5—[p—$(CH_3)_2NC_6H_4\underset{O}{N}$=CH—]

(141) 4—$C_2H_5$—5—[p—$(CH_3)_2NC_6H_4\underset{O}{N}$=CH—]

(142) 4—(n—$C_3H_7$—)—5—[p—$(CH_3)_2NC_6H_4\underset{O}{N}$=CH—]

(143) 4—$C_6H_5$—5—[p—$(CH_3)_2NC_6H_4\underset{O}{N}$=CH—]

(144) 4-HS-5-$C_6H_5$-
(145) 4-HS-5-(p-$CH_3OC_6H_4$-)
(146) 4-$CH_3$S-5-$C_6H_5$-
(147) 4-$CH_3$S-5-(p-$CH_3OC_6H_4$-)
(148) 4-$CH_3$COS-5-$C_6H_5$-
(149) 4-$CH_3$COS-5-(p-$CH_3OC_6H_4$-)
(150) 4-$C_6H_5$COS-5-$C_6H_5$-
(151) 4-$C_6H_5$COS-5-(p-$CH_3OC_6H_4$-)
(152) 4-$CH_3$O-5-$C_6H_5$-

Any suitable quaternizing agent may be employed, for example, (1) Alkyl halides such as methyl iodide, butyl iodide, butyl bromide, etc.
(2) Sulfuric acid and derivatives $H_2SO_4$, $R_2SO_4$ where R is alkyl, etc., methyl, ethyl, etc. for example $(Me)_2SO_4$
(3) Alkyl thioureas such as methyl thiourea, etc.
(4) Sulfonate esters, for example

where R is alkyl such as methyl, etc., and R is hydrogen, alkyl, etc. for example methyl p-toluene sulfonates.
(5) Alkyl phosphates, e.g. $(MeO)_3PO$, $(EtO)_3PO$, etc.

USE IN FLUIDS FOR DRILLING WELLS

This phase of the invention relates to the use of the compounds of this invention as corrosion inhibitors in producing an improved drilling fluid useful in drilling oil and gas wells.

Fluids commonly used for the drilling of oil and gas wells are of two general types: water-base drilling fluids comprising, for example, a clay suspended in water, and oil-base drilling fluids comprising, for example, a clay or calcium carbonate suspended in mineral oil.

A third type of drilling fluid which has recently been developed, is one of oil-in-water or water-in-oil emulsion, for example, emulsions of mineral oil in water or water in mineral oil formed by means of emulsifiers such as sulfuric acid: Turkey-red oil; soaps of fatty acids, for example, sodium oleate; emulsoid colloids, for example starch, sodium alginate, etc. Varying amounts of finely divided clay, silica, calcium carbonate, blown asphalt and other materials may be added to these emulsions to improve their properties and control their weight.

We have now discovered that the compositions of this invention can be employed as a corrosion inhibitor in drilling fluids.

USE IN AIR DRILLING

It has long been conventional practice in drilling deep bore holes to circulate a drilling mud down through the drill stem and up through the bore hole between the wall of the bore hole and the drill stem for the removal of chips or cuttings from the bore hole and to provide support for the wall of the bore hole. More recently, in the drilling of holes in which wall support provided by drilling mud is not employed, drilling has been carried out with the use of air for chip removal. Such drilling is not only normally faster than mud drilling but is indispensable in areas where the supply of water is limited or when drilling through cavernous formations into which the drilling mud flows and becomes lost.

The increasing popularity of air or gas drilling has come about not only because this method of drilling is frequently faster, as noted above, but for the additional reasons that the drill bits last longer, the provision and handling of water under wide ranges of temperature conditions is avoided, boring samples are easily observed when they are not mixed with mud, and there is no loss involved as in the case of mud drilling when drilling through cavernous formations. Furthermore, prompt removal of water entering the hole maintains a dry hole and the likelihood of wall collapse is thereby reduced.

In a typical air drilling operation there may be provided, for example, an up-flow of air in the bore hole having a velocity of the order of 3,000 feet per minute. This flow of air upwardly through the bore hole, which is produced by air pumped downwardly through the drill stem, provides adequate removal of cuttings. The air is delivered to the drill stem at pressures of 20 to 60 lbs. per square inch and for dewatering or for breaking obstructions, as will be hereinafter described, the pressures may be increased to 180 to 200 lbs. or more per square inch.

Air drilling operations are frequently hampered by the inflow of water into the bore hole when the drill bit is penetrating a water bearing stratum or when the bore hole has passed through a water bearing stratum that has not been cased. Normally, if drilling proceeds uninterruptedly both before and during penetration into a water bearing stratum, the flow of air is sufficient to blow the water out of the bore hole along with the cuttings and drilling dirt. There are, however, two major problems encountered in air drilling when water is entering the bore hole. The first problem occurs when there is a small inflow of water sufficient to cause a dampening of the cuttings which, under certain conditions, will then ball-up, clogging and sometimes jamming the drill bit. The second problem is encountered when there is a substantial amount of water remaining in the bottom of the bore hole during drilling causing a sloughing of the side wall of the bore hole. This latter condition may arise even though the water entering the bore hole is being blown out of the hole as fast as it enters. If there is a substantial inflow of water or if there is a substantial flow of water past a region of the bore hole susceptible to this condition, the water passing that region of the bore hole may cause a sloughing of the side wall.

The addition of foam forming materials to the air flow when air drilling is employed in conjunction with sufficient water to provide foaming gives rise to numerous advantages in drilling operations. The water may be introduced either through a water bearing stratum being penetrated by the drill bit or, alternatively, if the hole is dry, water may be introduced from the surface of the earth through the drill stem in conjunction with the delivery of compressed air and foam forming material through the drill stem to the drill bit. In either case the water may be said to be existing in the bore hole, and drilling operations are described in U.S. Pat. 3,130,798.

The compositions of this invention can be employed as a corrosion inhibitor in a drilling system.

The compositions of this invention may also be added to other aqueous and/or oxygenated systems such as steam generating systems, water circulating systems such as in cooling towers, in automobile radiators, in diesel locomotive engines, in boiler water, sea-water ship ballast, etc.

The amount of the compositions of the invention to be employed as a corrosion inhibitor can vary widely depending upon particular compounds, the particular system, the amounts of oxygen present, etc. We may employ concentrations of from about 0.5 to 5,000 p.p.m., such as from about 4 to 4,000 p.p.m., for example from about 20 to 2,000 p.p.m., but preferably from about 100 to 1,000 p.p.m. The optimum amount, to be determined in each instance, which will depend on function and economics, can be lesser or greater than the above amounts under proper conditions.

USE IN BRINES

This phase of the invention relates to the prevention of corrosion in systems containing a corrosive aqueous medium, and most particularly in systems containing brines.

More particularly, this invention relates to the prevention of corrosion in the secondary recovery of petroleum by water flooding and in the disposal of waste water and brine from oil and gas wells. Still more particularly, this invention relates to a process of preventing corrosion in water flooding and in the disposal of waste water and brine from oil and gas wells which is characterized by injecting into an underground formation an aqueous solution containing minor amounts of compositions of this invention, in sufficient amounts to prevent the corrosion of metals employed in such operation. This invention also relates to corrosion inhibited brine solutions of these compounds.

When an oil well ceases to flow by the natural pressure in the formation and/or substantial quantities of oil can no longer be obtained by the usual pumping methods, various processes are sometimes used for the treatment of the oil-bearing formation in order to increase the flow of the oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is refererd to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

We have now discovered a method of preventing corrosion in systems containing a corrosive aqueous media, and most particularly in systems containing brines, which is characterized by employing the compositions of this invention.

We have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation the compositions of this invention.

This phase of the invention then is particularly concerned with preventing corrosion in a water flooding process characterized by the flooding medium containing an aqueous or an oil field brine solution of these compounds.

In many oil fields large volumes of water are produced and must be dsiposed of where water flooding operations are not in use or where water flooding operations cannot handle the amount of produced water. Most states have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of the compound of this invention, sufficient to prevent corrosion, in concentrations of about 10 p.p.m. to 10,000 p.p.m., or more, for example, about 50 to 5000 p.p.m., but preferably about 15 to 1,500 p.p.m. The upper limiting amount of the compounds is determined by economic considerations. Since the success of a water flooding operation manifestly depends upon its total cost being less than the value of the additional oil recovered from the oil reservoir, it is quite important to use as little as possible of these compounds consistent with optimum corrosion inhibition. Optimum performance is generally obtained employing about 1,000 p.p.m. Since these compounds are themselves inexpensive and are used in low concentrations, they enhance the success of a flood operation by lowering the cost thereof.

In addition, these compounds are not sensitive to oxygen content of the water and these are effective corrosion inhibitors in both open water flooding systems and closed water flooding systems.

While the flooding medium employed in accordance with the present invention contains water or oil field brine and the compounds, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarily, they may be employed in conjunction with any of the operating techniques commonly employed in water flooding and water disposal processes, for example five spot flooding, peripheral flooding, etc., and in conjunction with other secondary recovery methods.

Corrosion tests were made using sand blasted 1020 mild steel coupons monitored by a polarization resistance meter, a Pair instrument described in U.S. Pat. 3,406,101. These tests were made in cylindrical containers of 1500 cc. volume with provision for constant stirring by means of a motor driven impeller. A thermostatically controlled immersion heater maintained an average temperature of 75° C. and an air inlet kept the fluids constantly saturated with air. Between each test the cylinder was cleaned with steam, benzene, acetone and thoroughly washed with clean water. Results of these corrosion tests made in various aqueous environments are shown in the following table.

Protection is calculated in the usual manner from corrosion rate ($R_1$) of fluids without inhibitor and corrosion rate ($R_2$) in presence of particular inhibitor according to the formula $$\frac{R_1 - R_2}{R_1} \times 100 = \text{Percent protection}$$

The quaternized 1,2-dithiole-3-thiones are excellent inhibitors in hot aerated brines containing 4.2% NaCl, 1.75% $MgCl_2$, 0.15% $CaCl_2$, 0.09% $Na_2SO_4$ Table II gives the values for continuous aerated hot (75° C.) brines.

TABLE II

| Compound | P.p.m. | Time, hrs. | Percent protection |
|---|---|---|---|
| Example: | | | |
| 4 — 3-S-methyl-4,5-tetramethylene-1,2-dithiole-3-thione-methosulfate | 1,000 | 21 | 97 |
| 1 — 3-S-methyl-4-phenyl-1,2-dithiole-3-thione-methosulfate | 1,000 | 21 | 51 |
| 2 — 3-S-methyl-5-(3-methoxy-4-hydroxyl)-phenyl-1,2-dithiole-3-thione-methosulfate | 1,000 | 21 | 98 |
| 3 — 3-S-methyl-4-neopentyl-5-t-butyl-1,2-dithiole-3-thione-methosulfate | 1,000 | 21 | 98 |
| Mercaptobenzothiazole | 1,000 | 21 | 30 |
| Commercial imidazoline | 1,000 | 21 | 5 |

USE IN ACID SYSTEMS

The compounds of this invention can also be employed as corrosion inhibitors for acid systems, for example as illustrated by the pickling of ferrous metals, the treatment of calcareous earth formation, etc., as described in the following sections.

USE AS PICKLING INHIBITORS

This phase of the invention relates to pickling. More particularly, the invention is directed to a pickling composition and to a method of pickling ferrous metal. The term "ferrous metal" as used herein refers to iron, iron alloys and steel.

To prepare ferrous metal sheet, strip, etc. for subsequent processing, it is frequently desirable to remove oxide coating, formed during manufacturing, from the surface. The presence of oxide coating, referred to as "scale" is objectionable when the material is to undergo subsequent processing. Thus, for example, oxide scale must be removed and a clean surface provided if satisfactory results are to be obtained from hot rolled sheet and strip in any operation involving deformation of the product. Similarly, steel prepared for drawing must possess a clean surface and removal of the oxide scale therefrom is essential since the scale tends to shorten drawing-die life as well as destroy the surface smoothness of the finished product. Oxide removal from sheet or strip is also necessary prior to coating operations to permit proper alloying or adherence of the coating to the ferrous metal strip or sheet. Prior to cold reduction, it is necessary that the oxide formed during hot rolling be completely removed to preclude surface irrgularities and enable uniform reduction of the work.

The chemical process used to remove oxide from metal surfaces is referred to as "pickling." Typical pickling processes involve the use of aqueous acid solutions, usually inorganic acids, into which the metal article is immersed. The acid solution reacts with the oxides to form water and a salt of the acid. A common problem in this process is "overpickling" which is a condition resulting when the ferrous metal remains in the pickling solution after the oxide scale is removed from the surface and the pickling solution reacts with the ferrous base metal. An additional difficulty in pickling results from the liberated hydrogen being absorbed by the base metal and causing hydrogen embrittlement. To overcome the aforementioned problems in pickling, it has been customary to add corrosion inhibitors to the pickling solution.

The present invention avoids the above-described problems in pickling ferrous metal articles and provides a pickling composition which minimizes corrosion, overpickling and hydrogen embrittlement. Thus the pickling inhibitors described herein not only prevent excessive dissolution of the ferrous base metal but effectively limit the amount of hydrogen absorption thereby during pickling. According to the invention, a pickling composition for ferrous metal is provided which comprises a pickling acid such as sulfuric or hydrochloric acid and a small but effective amount of the dithiol thione compound of this invention, for example at least about 5 p.p.m., such as from about 100 to 5,000 p.p.m., but preferably for about 500 to 1,500 p.p.m.

Ferrous metal articles are pickled by contacting the surface (usually by immersion in the pickling solution) with a pickling composition as described to remove oxide from their surface with minimum dissolution and hydrogen embrittlement thereof and then washing the ferrous metal to remove the pickling composition therefrom.

USE IN ACIDIZING EARTH FORMATIONS

The compositions of this invention can also be used as corrosion inhibitors in acidizing media employed in the treatment of deep wells to reverse the production of petroleum or gas therefrom and more particularly to an improved method of acidizing a calcareous or magnesium oil-bearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

The corrosion inhibitors were evaluated using sand blasted 1020 mild steel coupons monitored by a polarization resistance meter, a Pair instrument described in U.S. Pat. 3,406,101.

The acid was placed in a beaker and the coupons placed in the acid. Corrosion rates were measured at various time intervals and percent protection calculated in the usual manner as follows:

$$\text{Percent protection} = \frac{R_1 - R_2}{R_1} \times 100$$

where $R_1$ is corrosion rate without inhibitor
$R_2$ is corrosion in presence of inhibitor.

The utility of the compositions of this invention is illustrated in the following table.

TABLE III.—USE AS CORROSION INHIBITORS IN HIGHLY ACID SYSTEMS

| Compound | p.p.m. | Acid | Time, min. | Percent protection |
|---|---|---|---|---|
| Example: | | | | |
| 4 ........ 3-S-methyl-4,5-tetramethylene-1,2 dithiole-3-thione methosulfate ....... | 1,000 | 20% $H_2SO_4$ ................ | 240 | 99.6 |
| 1 ........ 3-S-methyl-4-phenyl-1,2 dithiole thione methosulfate .............. | 500 | 20% $H_2SO_4$ ................ | 78 | 94.0 |
| 1 ................ do ................ | 1,000 | 85% phosphoric acid .......... | (¹) | 99.8 |
| 1 ................ do ................ | 1,000 | 85% phosphoric acid; 10% HF ... | (²) | 99.5 |
| 4 ........ 3-S-methyl-4,5-tetramethylene-1,2 dithiole-3-thione methosulfate ....... | 1,000 | 20% $H_2SO_4$ ................ | 43 | 99.8 |
| 3 ........ 3-S-methyl-4-t-butyl-5-neopentyl-1,2 dithiole-3-thione methosulfate ..... | 500 | 20% $H_2SO_4$ ................ | 45 | 99.7 |
| 3 ................ do ................ | 1,000 | 19% HCl ................ | 43 | 99.0 |

¹ 18 hours.
² 20 hours.

Another important aspect of pickling inhibitors is that they should remain effective in presence of dissolved ferrous ions (from dissolution of the oxide scale). The continued effectiveness of the present compositions is illustrated in the following table:

TABLE IV

| Inhibitor | Concentration, p.p.m. | Sulfuric acid, percent | Ferrous iron | Time in mins. | Percent protection |
|---|---|---|---|---|---|
| Example: | | | | | |
| 4 ........ | 1,000 | 20 | ................ | 45 | 99.8 |
| 4 ........ | 1,000 | 20 | 6% as $FeSO_4$ .... | 45 | 94 |
| 4 ........ | 1,000 | 20 | 6% as $FeCl_2$ .... | 45 | 95 |
| 4 ........ | 1,000 | 20 | ..... do ........ | 390 | 98 |

The term "1,2-dithiole-3-thione compound" includes 1,2-dithiole-3-thiones and derivatives thereof. Because of their enhanced solubility in aqueous systems, including brines and acid systems, the most effective derivative is the thionium derivative.

The amount of 1,2-dithiole-3-thione compound employed in treating the corrosive systems of this invention will vary with the particular compound employed, the particular system, the solids present in the system, the degree of corrosivity of the system, etc. A minor amount of the compound is generally employed sufficient to impart corrosion protection to the system. In general one employs concentration of trace amounts such as from about 0.1 p.p.m. to 10,000 p.p.m., for example from 5 to 5,000 p.p.m. such as from 100 to 2,500 p.p.m., but preferably from 500 to 2,000 p.p.m. In practice, concentrations of 1,000±200 p.p.m., are employed.

As is quite evident, new 1,2-dithiole-3-thione compounds will be constantly developed which could be useful in our invention. It is, therefore, not only impossible to attempt a comprehensive catalogue of such compositions, but to attempt to describe the invention in its broader aspects in terms of specific chemical names used would be too voluminous and unnecessary since one skilled in the art could by following the description of the invention herein select a useful dithiole-thione compound. This invention lies in the use of suitable dithiole-thione compounds as corrosion inhibitors in aqueous and/or oxygenated and/or acid systems and their individual compositions are important only in the sense that their properties can affect this function. To precisely define each specific useful dithiole-thione compound and aqueous system in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific dithiole-thione compounds suitable for this invention by applying them in the process set forth herein. In analogy to the case of a machine, wherein the use of certain materials of construction or dimensions of part would lead to no practical useful result, various materials will be rejected as inapplicable where others would be operative. We can obviously assume that no one will wish to use a useless thiole-thione compound nor will be misled because it is possible to misapply the teachings of the present disclosure to do so. Thus, any thiole-thione or mixtures containing them that can perform the function stated herein can be employed.

Having thus described our invention what we claim as new and desire to obtain by Letters Patent is:

1. A process of inhibiting corrosion of a metal in a metal corrosive medium which comprises contacting said metal in said corrosive medium with a compound selected from the group consisting of 3-S-methyl-4,5-tetramethylene - 1,2 - dithiole - 3 - thione - methosulfate and 3 - S-methyl - 4 - neopentyl - 5 - t - butyl - 1,2 - dithiole - 3-thione-methosulfate.

2. The process of claim 1 wherein the compound is 3-S-methyl-4-neopentyl-5-t-butyl-1,2 - dithiole - 3 - thione-methosulfate.

3. The process of claim 2 wherein the corrosive medium is an aqueous brine system.

4. The process of claim 2 wherein the corrosive medium is an aqueous system in the presence of air.

5. The process of claim 2 wherein the corrosive medium is an acid system.

6. The process of claim 5 wherein the acid system is an aqueous acid.

References Cited
UNITED STATES PATENTS

| | | | |
|---|---|---|---|
| 2,742,369 | 4/1956 | Hatch | 21—2.5 UX |
| 2,816,075 | 12/1957 | Fields | 252—395 X |
| 2,905,696 | 9/1959 | Fields | 252—395 X |
| 2,912,386 | 11/1959 | Salzberg | 252—395 |
| 3,374,112 | 9/1966 | Blomstrom | 252—395 X |
| 3,345,380 | 10/1967 | Hodgson | 252—395 X |
| 3,350,408 | 10/1967 | Hodgson | 252—395 X |
| 3,394,146 | 7/1968 | Hodgson et al. | 252—395 X |
| 3,444,163 | 5/1969 | Smutny | 260—327 C X |
| 3,457,185 | 7/1969 | Betty et al. | 252—395 X |

FOREIGN PATENTS

| | | | |
|---|---|---|---|
| 1,038,866 | 9/1958 | Germany | 252—395 |

BARRY S. RICHMAN, Primary Examiner

U.S. Cl. X.R.

21—2.7; 134—3, 41; 252—8.55 E, 395